United States Patent [19]

Ross

[11] Patent Number: 4,928,938

[45] Date of Patent: May 29, 1990

[54] CLAMPING DEVICE

[76] Inventor: Leo R. Ross, R.R. #1, Box 333, Kendall Rd., Ashby, Mass. 01431-9770

[21] Appl. No.: 337,370

[22] Filed: Apr. 13, 1989

[51] Int. Cl.[5] .......... B23Q 1/04

[52] U.S. Cl. .......... 269/261; 269/266; 269/277; 269/283

[58] Field of Search .......... 269/264, 261, 265, 266, 269/268–270, 279, 277, 283, 258; 279/1 SJ, 123

[56] References Cited

U.S. PATENT DOCUMENTS 4,306,709 12/1981 Hurn .......... 269/283

4,583,724 4/1986 Huang .......... 269/283

FOREIGN PATENT DOCUMENTS 2157203 10/1985 United Kingdom .......... 269/268

*Primary Examiner*—Robert C. Watson

*Attorney, Agent, or Firm*—Pearson & Pearson

[57] ABSTRACT

A clamping means for clamping a work piece with non-planar surfaces in a vise. The clamping means comprises two support blocks and three or four clamping members. Each clamping member has a stem portion and a collinear work piece engagement portion. The support blocks position the stem portions to define a plane tangent to the stem portions that is spaced from the support block and parallel to it. Jaws on the vise contact the stem portions directly on this plane, and not the support block. The tops of the support constitute a horizontal support for the work piece as the jaws are tightened to close the work piece engagement portions into clamping engagement at locations spaced about the periphery of the work piece.

9 Claims, 2 Drawing Sheets

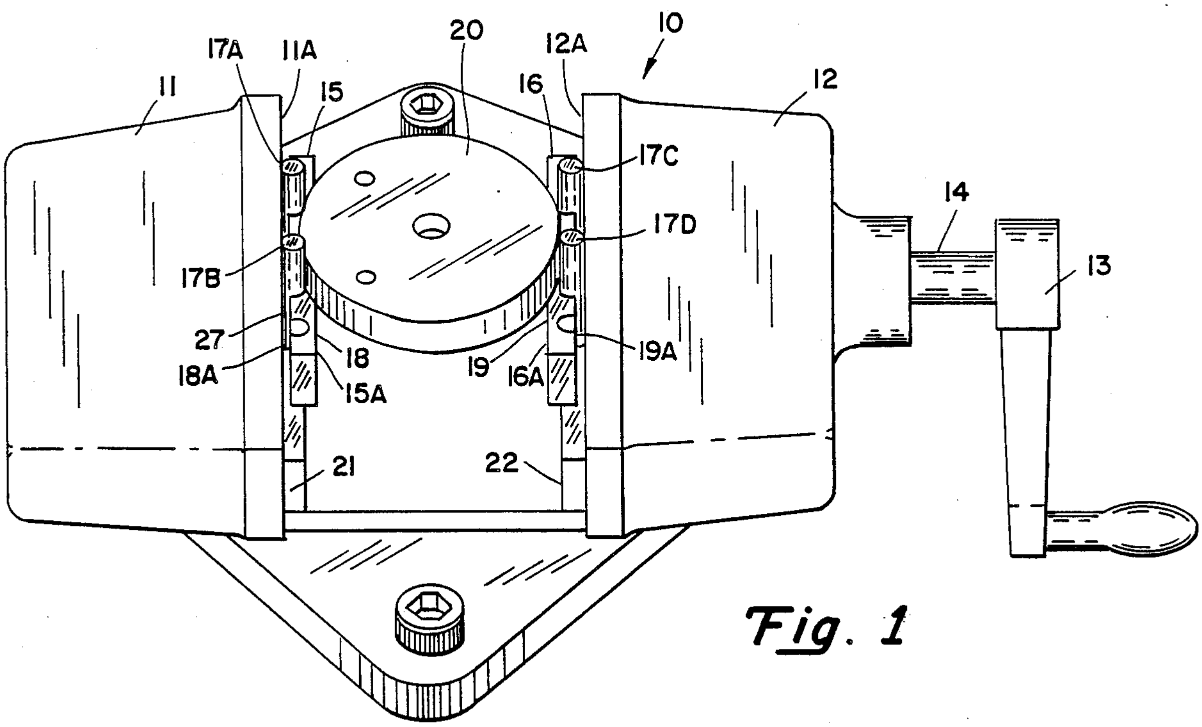
Fig. 1
Fig. 2
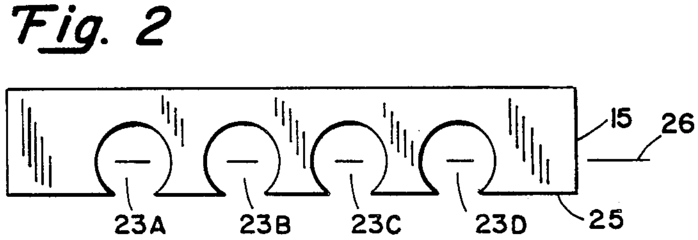
Fig. 3
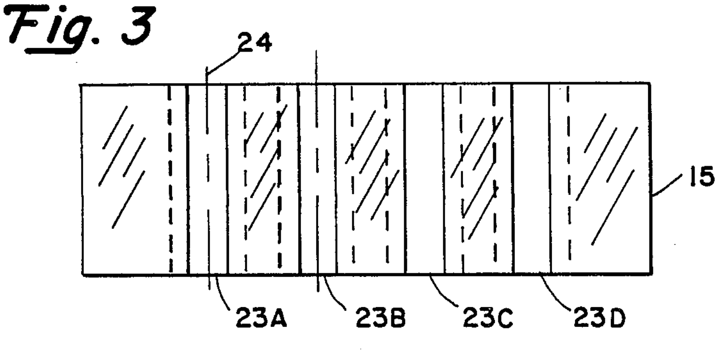
Fig. 4
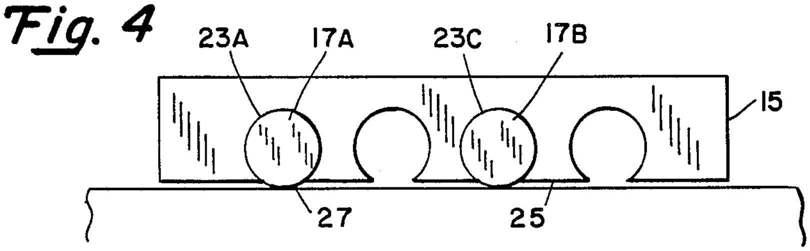

CLAMPING DEVICE

FIELD OF THE INVENTION

This invention generally relates to clamping devices such as vises and more specifically to attachments for such clamping devices that enable the support of certain irregularly shaped and circular pieces.

RELATED REFERENCES

Reference is made to the following Letters Patent of the United States:

- U.S. Pat. No. 1,425,275 to Paulsen Aug. 8, 1922 for "Three-in-one Clamp and Vise Combined".
- U.S. Pat. No. 1,989,087 to Eibert Jan. 29, 1935 for "Device for Straightening Type Levers for Typewriters".
- U.S. Pat. No. 2,401,054 to H. B. Daley May 28, 1946 for "Combination Work and Jig Support".
- U.S. Pat. No. 2,421,957 to T. E. Mead June 10, 1947 for "Work Holding Apparatus".
- U.S. Pat. No. 3,463,478 to Everett T. Hennessey, Aug. 26, 1969 for "Workpiece Positioning Device for Machine Tools".
- U.S. Pat. No. 3,463,479 to E. T. Hennessey, Aug. 26, 1969 for "Workpiece Positioning Device for Machine Tools".
- U.S. Pat. No. 4,159,821 to Ronald P. Hickman, July 3, 1979 for "Collapsible Dual-Height Workbench".

BACKGROUND OF THE INVENTION

Vises, clamps and other clamping devices normally comprise two parallel jaws that move toward each other to clamp a work piece between them. Typically such jaws have flat clamping surfaces that are suited to clamp a work piece with at least one substantially planar surface that is engaged by the clamping surface. Many times, however, such vises are used in the machining of irregularly shaped or circular pieces merely by tightening the device sufficiently to prevent movement during a machining operation. In many situations, however, this will deform the work piece or, particularly with finished work pieces, mar the surface.

More specifically, such vises often times clamp a work piece on a drill press, milling machine or other similar machine tools for drilling or machining operation. For example, if it is necessary to work on a circular object, that clamping forces are exerted only along opposite disposed tangential lines of the work piece. As a result it is very difficult to maintain the work piece in a stable position, particularly if the working forces are exerted off the line between these two clamping lines, and even if the clamping forces are large.

In such situations it is commonplace to build a special fixture, or jig, that clamps the work piece directly onto a clamping surface. For example, Mead discloses a special hold down clamp on a fixture to be mounted on a drill press or milling machine work table. Of course the manufacture or construction of such jigs for a one-time machining operation can greatly extend machining times and increase overall machining costs.

Paulsen discloses modifications to a conventional vise to include pins that are permanently mounted on the top surface of two jaw structures. These pins are stated to be useful in holding annular articles. However, the pins are fixed in the jaws and are displaced from the clamping surfaces. They do not provide great flexibility for accommodating irregularly shaped objects of a wide range of sizes and shapes. Moreover, the vise itself must be modified which is not an easy task after manufacture.

Hickman discloses a workbench with beams that form elongated vise jaws. These beams include a number of holes. Special pins can be located in an arbitrary array in the holes to clamp irregular objects between or among the pins. While this array of holes on the vise beams provides flexibility, it also increases the size of the vise jaws and requires special machining of the vise jaws, such as disclosed by Paulsen.

Hennessey discloses a work piece positioning block with a plurality of horizontal holes extending in from a clamping face on the block. Dowels or pins selectively inserted in the holes orient a work piece in a vertical plane when a supporting vise is closed, thereby clamping the work piece between one of the vise jaws and the work piece positioning block.

Eibert discloses a special fixture for straightening type letters. A unitary bracket positioned between vise jaws contains insets that contact opposite sides of a type lever at spaced locations along its length. One of the insets is movable when one of the clamp jaws engages a bolt to displace it and force that inset on one side toward the opposite stationary insets thereby to deform the type lever.

Daley discloses a support for cylindrical work pieces that includes two hinged plates. One plate is fixed to a drill press table or other work table. The second hinged plate has holes for receiving dowel pins that are arranged to support the work piece when the second plate is raised to some angle or to allow a separate clamp to affix a work piece to the second plate when it is vertical.

Each of the foregoing patents discloses a jig or fixture that are used with jaws for supporting circular or irregularly shaped work pieces. However, Paulsen and Hickman require a direct modification to the clamping device; Hennessey and Daley provide a direct clamping of the work piece by at least one of the jaws. Mead discloses a specific hold down arrangement. There is no disclosure of a simple fixture that can be used to support an irregularly shaped or circular work piece for subsequent machining or other operations on a machine tool or the like in a conventional vise or like device.

SUMMARY OF THE INVENTION

Therefore it is an object of this invention to provide an attachment for a vise or other clamping attachment that will hold irregularly shaped and circular work pieces in a stable position.

Another object of this invention is to provide a clamping attachment that holds an irregularly shaped or circular work piece without damaging the work piece.

Yet another object of this invention is to provide a clamping attachment for irregularly shaped and circular work pieces that will accommodate a wide range of work piece shapes with a maximum size limit imposed by the size of the vise or like clamping arrangement.

In accordance with this invention two supports positioned between clamping surfaces of vise jaws or the like support clamping members each having a stem portion and a collinear work piece engaging portion. The supports position the stem portions such that a tangential plane defined by the stem portions is displaced from and parallel to a corresponding support surface. The clamping suraces on vise jaws or the like engage the stem portions of this plane, rather than directly on the support. The collinear work piece engaging portions protrude above the supports to engage the work piece. As the jaws or the like are tightened, their clamping surfaces engage the stems only and force the work piece engagement portions of the clamping members into engagement with the work piece.

This invention is pointed out with particularity in the appended claims. The above and further objects and advantages of this invention may be better understood by referring to the following detailed description taken in conjunction with the accompanying drawings.

BRIEF DESCRIPTION OF THE DRAWINGS

FIG. 1 is a perspective view of a vise with a clamping means formed in accordance with this invention;

FIG. 2 is a top plan view of a support shown in FIG. 1;

FIG. 3 is an elevation view of the support shown in FIGS. 1 and 2;

FIG. 4 is a top plan view that depicts the relationship of the support, clamping members and vise jaws shown in FIG. 1;

DESCRIPTION OF THE PREFERRED EMBODIMENTS

Figure 5:
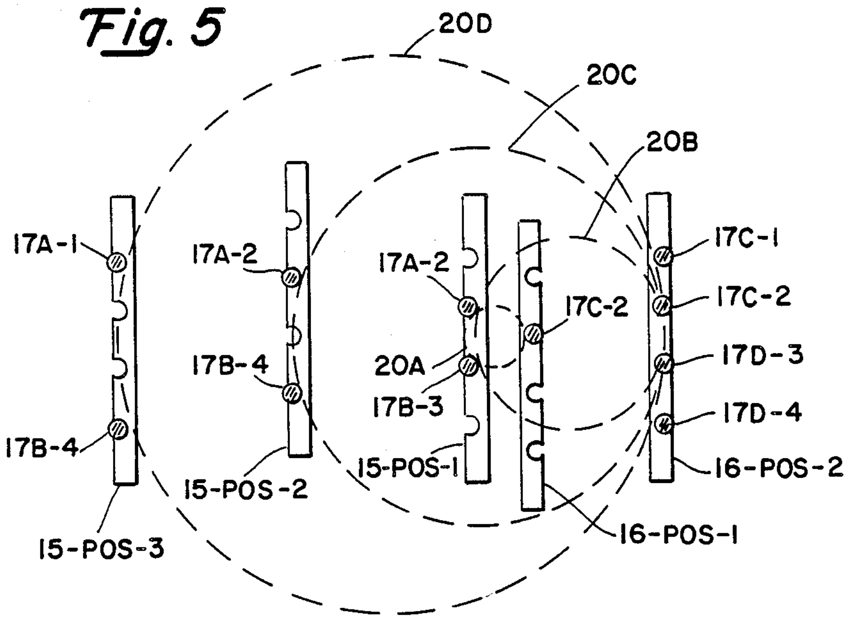
FIG. 5 depicts the various relationships of work piece sizes and clamping member positions.

FIG. 1 depicts a typical vise 10 that includes a fixed jaw 11 and a movable jaw 12. Usually the fixed and movable jaws 11 and 12 have smooth faces 11A and 12A and may be formed with or without horizontal and/or vertical vee grooves. A handle 13 and threaded shaft 14 rotate on a vise frame to displace the movable jaw 12 toward or away from the stationary jaw 11, all as is known in the art.

In accordance with this inventtion, a clamping means for irregularly shaped or circular work pieces includes a support block 15 positioned adjacent to stationary jaw 11, a support block 16 positioned against the movable jaw 12 and clamping members shown as dowel pins 17 (specifically 17A through 17D). More specifically, dowels 17A and 17B in the support 15 and dowels 17C and 17D in the support 16 engage a work piece 20. As described in detail later, the clamping surfaces 11A and 12A engage the dowels 17, not the supports 15 and 16. Moreover, the support blocks 15 and 16 have top horizontal surfaces 15A and 16A as shown in FIGS. 1 through 3 support the work piece 20 while the jaws 11 and 12 are tightened to enable the dowel pins 17 to clamp the work piece 20. Each support block 15 and 16 has a first face 18 and 19 and a rear face 18A and 19A wherein the sockets 23 and dowel pins 17A–17S are located.

In operation the jaws 11 and 12 are opened a sufficient distance to accommodate the supports 15 and 16 with the dowels 17 and the work piece 20. The supports 15 and 16 can be disposed directly on the base of the vise 10 or on conventional parallels, shown as parallel rectangular bars 21 and 22 in FIG. 1. Parallels are well known and do not form a part of this invention. Three or four dowels 17 are then disposed in various sockets in the support members 15 and 16 as described more fully with respect to FIG. 5. The work piece 20, shown here as a simple disk, can be disposed on the upper surfaces 15A and 16A of the blocks. The vise handle 13 then is cranked to tighten the jaws 11 and 12 against the dowels 17. As tightening continues, the dowels 17 center the work piece and the supports 15 and 16 on the work piece 20 between the jaws to even clamping forces that each of the dowels 17 exerts. Eventually the jaws 11 and 12 tighten against the dowels 17 sufficiently to force extensions or work piece engaging portions of the dowels above the supports 15 and 16 into contact with the work piece 20 and clamp it firmly in place.

FIGS. 2 and 3 are a top plan and elevation views of a typical support. In this particular embodiment, the rectangular block 15 has a series of holes or sockets 23A, 23B, 23C, and 23D. Each hole is vertical in FIG. 3 and the center lines 24 of the holes are parallel to each other. Moreover, the centers of the holes 23A through 23D lie on line 26 parallel to and offset from the surface 25 by a distance that is less than the radius of the holes 23. As a result, the holes break through the surface 25 and form open channels of circular cross section through the block 15.

Referring to FIG. 4, the holes or sockets 23 are formed of a diameter that permits dowels 17A and 17B to be inserted with a slip fit. With the open channel configuration shown in FIG. 2, the block 15 positions and captures the dowels 17A and 17B, with a portion 27 of each dowel 17A and 17B protruding slightly beyond the surface 25 of the block 15. Moreover, the block 15 is oriented, as shown in FIGS. 1 and 4, with the protruding portions 27 of the dowels in contact the surface 11A of jaw 11. Thus, jaw 11 exerts a force only on the dowels 17A and 17B directly; the jaw surface 11A does not contact the block 15. Stated differently, the clamping surfaces 15A and 16A engage the dowels 17A and 17B on a plane that is tangential to the dowels 17A and 17B, and spaced from the surface 25.

The blocks 15 and 16 also prevent the dowels 17 from pivoting under the work piece 20 during a clamping operation. As evident from FIG. 1, dowels by themselves normally would pivot about and under the work piece as the clamping force were applied. However, the dowels 17 are positioned in the blocks 15 and 16 with the blocks resting on the base of the vise, directly or through the parallel bars 21 and 22. The blocks 15 and 16 do not pivot once the clamping forces are applied, as any pivoting tends to increase the vertical dimension of the block.

FIG. 5 indicates the flexibility of a clamping apparatus incorporating this invention. For very small work pieces, such as the small disk represented by dashed circle 20A, the two blocks, represented at two positions and designated as 15-POS-1 and 16-POS-1, support three clamping members 17A-2, 17B-3, 17C-2 where the number to the left of the hypen in the clamping member reference designates a clamping member (i.e., 17A through 17D) while the number to the right represents one of four positions or sockets in a support member, position 1 being shown at the top of FIG. 5. As the jaws on the vise close and move the dowels together, they clamp the work piece 20A that lies on the blocks 15-POS-1 and 16-POS-2 at three points about the periphery of the work piece 20A.

For slightly larger work pieces as represented by dashed circle 20B, two clamping members are disposed in adjacent sockets in each of the supports, here represented by clamping members 17A-2, 17B-3, 17C-2 and 17D-3, and the supports 15-POS-1 and 16-POS-2 are more widely spaced. There are four clamping points about the periphery of the work piece 20B.

For larger work pieces, the clamping members may be placed in separated sockets as shown for work pieces 20C and 20D. For work piece 20C, the clamping members are shown as including 17A-2 and 17B-4 in support 15-POS-2B and 17C-2 and 17D-4 in support 16-POS-2. Even larger diameter work pieces, such as work piece 20D will be supported by clamping members 17A-1 and 17B-4 in support 15-POS-3 and by clamping members 17C-1 and 17D-4 in clamping member 16-POS-2.

As will be apparent, the throat of the vise jaws determines maximum size of a work piece. Moreover, the utilization of this clamping means minimizes any loss in this capacity because the jaws bear directly on the clamping members. With proper spacing of the clamping members, there can be essentially no loss of capacity. For example, the curvature of work piece 20D is such that the distance between the jaws and the closest portion of the work piece is less than the depth of a chord between the two lines of contact between the dowels 17 and the circumference of the work piece at its closest position to the jaws.

Figure 6:
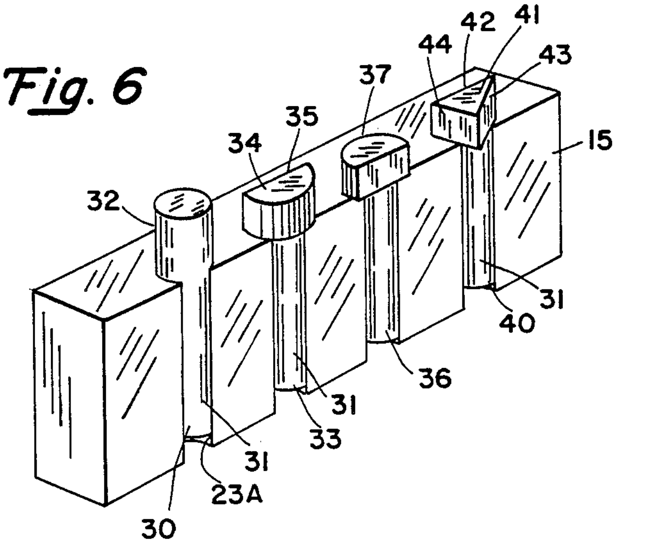
FIG. 6 depicts a variety of clamping members that can be utilized in accordance with this invention.

FIG. 6 depicts a variety of clamping members that can be used in accordance with this invention; each is shown in the support 15 by way of example. The simplest clamping member comprise a dowel pin 30 with a stem portion 31 in a socket 23A of the support 15 and a collinear work piece engaging portion 32 that is merely an extension of the stem portion 31. However, it is also possible to construct clamping members that are designed specifically for particular work pieces. For example, another clamping member 33 comprises a similar stem portion 31 and a collinear work piece engaging portion 34 that provides a flat work piece engaging surface 35. A clamping member 36 is identical to the clamping member 33, but rotated 180° to provide a cylindrical clamping surface 37. A clamping member 40 with a stem portion 31 includes a triangular work piece engaging portion 41. If the portion 41 is an irregular triangle in shape, there are three differently sized clamping surfaces 42, 43, and 44.

From the foregoing description, it will be apparent that a clamping arrangement for use in a vise or the like comprises an easily produced pair of supports in the form of blocks 15 and 16 as shown in FIGS. 1 through 6. A series of holes or sockets 23, are bored through the block. These holes are parallel to each other and are centered on a longitudinal axis that is offset from the center of the block so that holes form open parallel channels in the block. Clamping members disposed in the sockets define a tangential plane that is spaced from the block so that clamping surfaces on the vise or the like engage the clamping members and not the supports. Within this structure many variations are possible. For example, the number of sockets 23 in block 15 or 16 is arbitrary. A variety of clamping member structures are possible as evident from FIG. 6. Blocks may be produced with open sockets, as disclosed or with sockets that are closed at one end. Therefore it is the object of this invention to cover all such variations and modifications as come within the true spirit and scope of this invention.

I claim:

1. Clamping means for holding a work piece between first and second parallel clamping surfaces that are movable relative to each other, said clamping means comprising:

i. a plurality of clamping members, each said clamping member having a stem portion and a collinear work piece engaging portions, and ii. first and second support means for supporting said clamping members, each said support means having a planar surface and positioning means for capturing a said stem portion with a portion thereof being external to said support in a tangent plane that is displaced from and parallel to the said planar surface with each said work piece engagement portion being external to said support means whereby the clamping surfaces engage said clamping member stem portions along the tangent plane to move said work piece engaging portions into clamping engagement with the work piece.

2. A clamping means as recited in claim 1 wherein each of said support means includes a second planar surface adjacent said work piece engaging means and normal thereto for supporting the work piece during set up.

3. A clamping means as recited in claim 1 wherein said positioning means comprise sockets for receiving said stem portions of said clamping means with a slip fit relationship.

4. A clamping means as recited in claim 3 wherein the locus of the centers of each socket in a support is a straight line that is displaced from the planar surface by less than the diameter of said sockets.

5. A clamping means as recited in claim 1 wherein said stem portions are cylindrical in cross section and said positioning means in each said support means comprise cylindrical sockets for receiving said stem portions whereby said clamping members are free to rotate to align with the work piece.

6. A clamping means as recited in claim 5 wherein said clamping member comprises a dowel that has contiguous stem and work piece engaging portions.

7. A clamping means as recited in claim 5 wherein said work piece engagement portion is specially formed to correspond to the periphery of the work piece.

8. A clamping means as recited in claim 5 wherein the periphery of said work piece engagement portion includes an arcuate position and a planar position.

9. A clamping means as recited in claim 5 wherein said work piece engagement portion has triangular cross section.

* * * * *